UNITED STATES PATENT OFFICE.

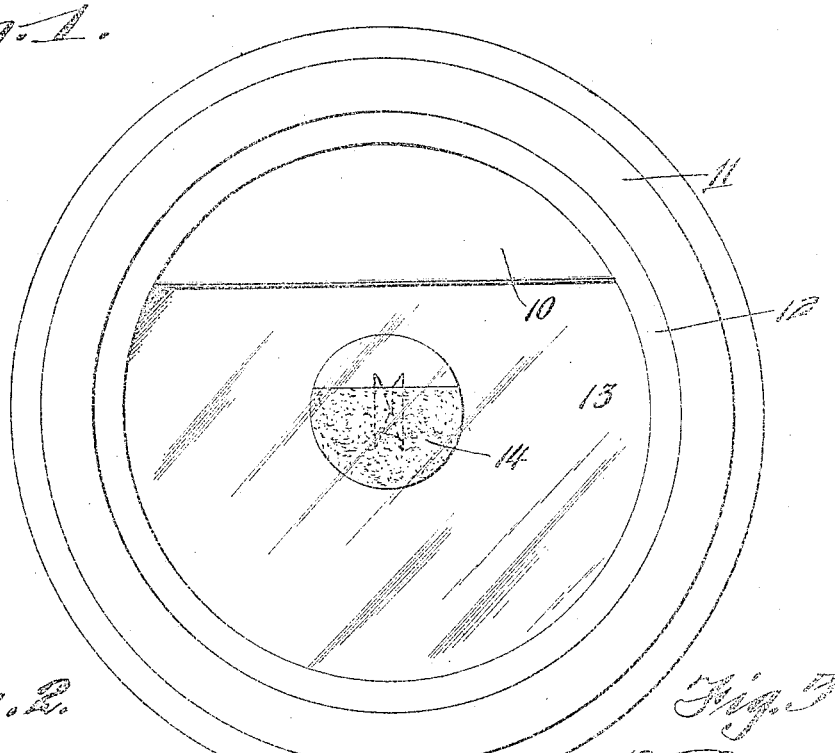
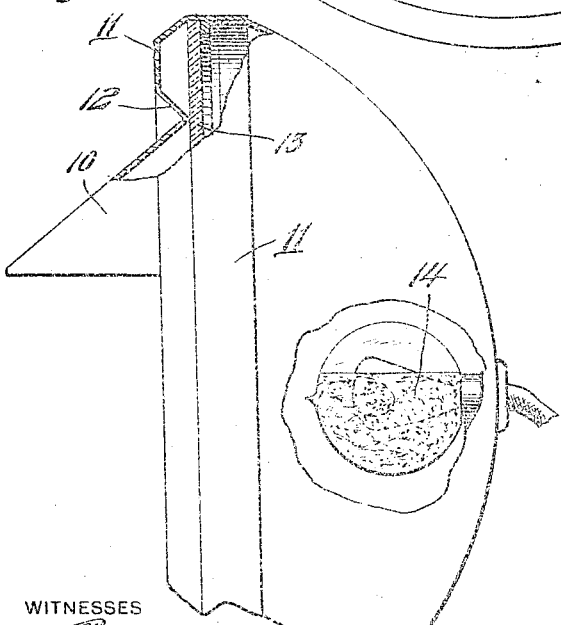
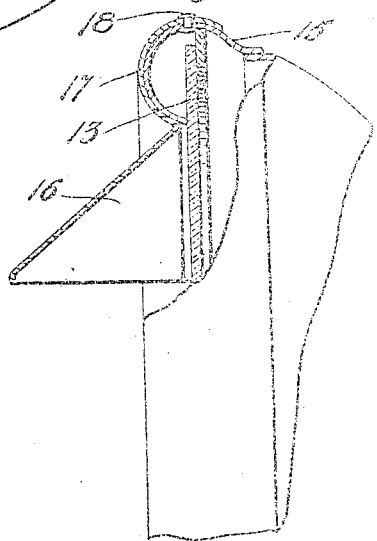

WILLIAM SEVILLE, OF BEVERLY, MASSACHUSETTS.

HEADLIGHT-SHIELD.

1,238,204.

Specification of Letters Patent. Patented Aug. 28, 1917.

Application filed March 23, 1916. Serial No. 86,202.

*To all whom it may concern:*

Be it known that I, WILLIAM SEVILLE, a citizen of the United States, residing at Beverly, in the county of Essex and State of Massachusetts, have invented certain new and useful Improvements in Headlight-Shields, of which the following is a specification.

This invention relates to an improved headlight shield or guard and the principal object of the invention is to provide a guard so constructed that it may form part of the glass holding rim or may be formed separate and either sprung into place about the glass holding rim of the light or secured by means of rivets.

Another object of the invention is to so construct this shield that it may be formed from a single sheet of sheet metal and to further so construct it that it may be readily transferred from one light to another.

This invention is illustrated in the accompanying drawings, wherein:—

Figure 1 is a view in elevation showing a headlight provided with the improved attachment.

Fig. 2 is a view principally in side elevation of the improved headlight with one portion of the headlight and attachment broken away.

Fig. 3 is a view similar to Fig. 2 showing the attachment separate from the headlight.

In the form shown in Figs. 1 and 2, this shield 10 and the glass holding rim 11 are formed from a single piece of sheet metal stamped to provide the inwardly extending glass engaging flange 12 from the upper portion of which there extends the shield. This shield covers about one-fourth of the diameter of the glass 13 and therefore the light from the bulb 14 will be prevented from blinding a person approaching the automobile. This bulb 14 may be frosted as shown in Figs. 1 and 2 or, if desired, the entire bulb may be frosted.

In the form shown in Fig. 3, the rim 15 for engaging the glass 13 is of the ordinary type and the shield or guard 16 is provided with a clamping collar 17 which fits upon the rim 15. This shield may be formed of resilient material thus creating a binding action upon the rim 15 or if desired, the shield may be held in place by rivets 18. It will thus be seen that the only difference between the two forms is that one is separate from the lamp and the second form is integral with the glass rim.

What is claimed is:—

1. A headlight comprising a casing, a glass, a rim carried by said casing and engaging the glass to hold the glass in place, said rim being curved transversely, a shield extending across the upper portion of the glass, and a transversely curved collar formed of resilient material extending from said shield and fitting about said rim to hold the shield in place.

2. A headlight comprising a casing, a glass, a rim carried by said casing and curved transversely with its inner edge portion within the outer periphery of the rim, a band within the rim engaging the inner face of the glass and holding the glass in place against the inner edge of the rim, a shield extending across the glass, and a transversely curved collar extending from said shield and fitting about said rim, said shield and collar being formed of resilient material to create a binding engagement between the collar and rim.

In testimony whereof I affix my signature in presence of two witnesses.

WILLIAM SEVILLE.

Witnesses:
L. STANFORD WILSON,
GEORGIANNA M. STONE.